United States Patent  
Merriam

Patent No.: US 6,643,781 B1
Date of Patent: Nov. 4, 2003

(54) METHOD AND APPARATUS FOR RENDERING STOLEN COMPUTING DEVICES INOPERABLE

(75) Inventor: Charles Merriam, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/311,786

(22) Filed: May 14, 1999

(51) Int. Cl.$^7$ ................................. G06F 9/00
(52) U.S. Cl. .................. 713/201; 713/200; 713/202; 713/168; 713/172; 709/229; 380/211; 380/255
(58) Field of Search .................. 713/200, 201, 713/168, 169, 172; 380/211, 255, 233; 709/229

(56) References Cited

U.S. PATENT DOCUMENTS 6,249,868 B1 * 6/2001 Sherman et al. ............ 713/168
6,304,969 B1 * 10/2001 Wasserman et al. ........ 713/172

* cited by examiner

Primary Examiner—Ly V. Hua
(74) Attorney, Agent, or Firm—Hickman Palermo Truong & Becker LLP; Bobby K. Truong; Christian A. Nicholes

(57) ABSTRACT

The present invention requires a computing device to interact with an authorized host computer on a fairly regular basis in order to maintain operability. In one embodiment, there is stored within the computing device an authorization parameter. This parameter is checked upon the occurrence of certain events to determine whether it has expired. If the authorization parameter has expired, then the present invention renders the computing device inoperable. The only way to update this parameter, and hence to maintain operability, is for the computing device to interact with an authorized host computer. Unless a thief knows which host computer to contact, and how to properly interact with that host computer (both of which are unlikely), the authorization parameter of a stolen device will not be updated. As a result, the stolen device will become inoperable within a relatively short time after the theft. By rendering a stolen device inoperable in this manner, the present invention significantly reduces the resale value of the device. This in turn removes the incentive for stealing the device in the first place. In this manner, the present invention deters the theft of computing devices.

30 Claims, 4 Drawing Sheets

METHOD AND APPARATUS FOR RENDERING STOLEN COMPUTING DEVICES INOPERABLE

BACKGROUND

This invention relates generally to computer systems and more particularly to a method and apparatus for rendering stolen computing devices inoperable.

In the past decade, the use of personal computers has greatly proliferated both in the work place and in the home. Along with desktop computers, the popularity of portable computing devices, such as laptop computers, notebook computers, and personal digital assistants, has also grown. With improved technology, portable computing devices now have processing and peripheral capabilities that rival those of desktop computers. For example, many portable devices now have high power, high speed processors, high capacity hard drives, CD-ROM drives, high resolution displays, large amounts of memory, and a multiplicity of ports. All of this capability is typically contained within a small, light weight package. Because of certain special considerations, such as size, weight, and power consumption, portable devices typically require special design and technology. As a result, portable devices are typically significantly more expensive than desktop computers having comparable capabilities.

The portability and high cost of portable computing devices make them prime targets for theft. Their portability makes them quite easy to steal, and their high cost (and hence, high resale value) gives thieves great incentive to steal. Theft of portable computing devices has become prevalent to the point that most people have either had a device stolen within the past few years, or know of someone who has had a device stolen within the past few years. According to various statistics, theft of portable computing devices costs businesses millions of dollars each year.

It is a generally accepted fact that portable device theft cannot be completely stopped. Device owners will inevitably be careless in transporting their devices, and thieves will be clever in developing schemes to steal the devices. While theft of portable devices cannot be completely stopped, it can be significantly deterred. One way to deter the theft is to render the stolen device inoperable. If the stolen device does not operate, then it will have little or no resale value. If the thief cannot sell the device for any significant sum, then the thief will have little incentive to steal the device. The theft of portable computing devices is thus deterred.

With deterrence being the premise, the problem becomes the manner in which the portable device should be rendered inoperable. Some basic methodologies have been developed for this purpose. The main methodology involves the use of software passwords. That is, certain strategic pieces of software on the portable device are password protected such that they will only run if a user inputs the proper password. Assuming that the password cannot be easily guessed, and that the thief does not know the password, these pieces of software will become unexecutable by the thief or a customer of the thief. If the password protection mechanism is imposed upon a fundamental set of software, such as the operating system which is relied upon by almost all other sets of software, then this methodology can effectively render the portable device inoperable.

The major problem with this methodology is that it will only deter thieves with relatively low sophistication. More sophisticated thieves will realize that such a protection mechanism can be circumvented by simply unloading the protected software from the stolen device and reinstalling it. When the software is reinstalled, the thief can set the password to one that he knows. As this discussion shows, the currently available mechanism for rendering a stolen device inoperable leaves much to be desired. A more effective mechanism is needed.

SUMMARY OF THE INVENTION

The present invention provides an effective mechanism for rendering a stolen computing device inoperable. The present invention is based, at least partially, upon the observation that many computing devices in existence are owned by large companies with centralized host computers. These companies typically require that the data on a computing device be periodically synchronized with the data in the host computer. Thus, it is usually necessary for the computing device to interact with the host computer on a fairly regular basis. The present invention takes advantage of this regular interaction to deter theft of the computing device.

More specifically, the present invention requires a computing device to interact with an authorized host computer on a fairly regular basis in order to maintain operability. In one embodiment, there is stored within the computing device an authorization parameter. This parameter is checked upon the occurrence of certain events to determine whether it has expired. If the authorization parameter has expired, then the present invention renders the computing device inoperable. The only way to update this parameter, and hence to maintain operability, is for the computing device to interact with an authorized host computer. Unless a thief knows which host computer to contact, and how to properly interact with that host computer (both of which are unlikely), the authorization parameter of a stolen device will not be updated. As a result, the stolen device will become inoperable within a relatively short time after the theft. By rendering a stolen device inoperable in this manner, the present invention significantly reduces the resale value of the device. This in turn removes the incentive for stealing the device in the first place. In this manner, the present invention deters the theft of computing devices.

DETAILED DESCRIPTION OF THE EMBODIMENT(S)

Figure 1:
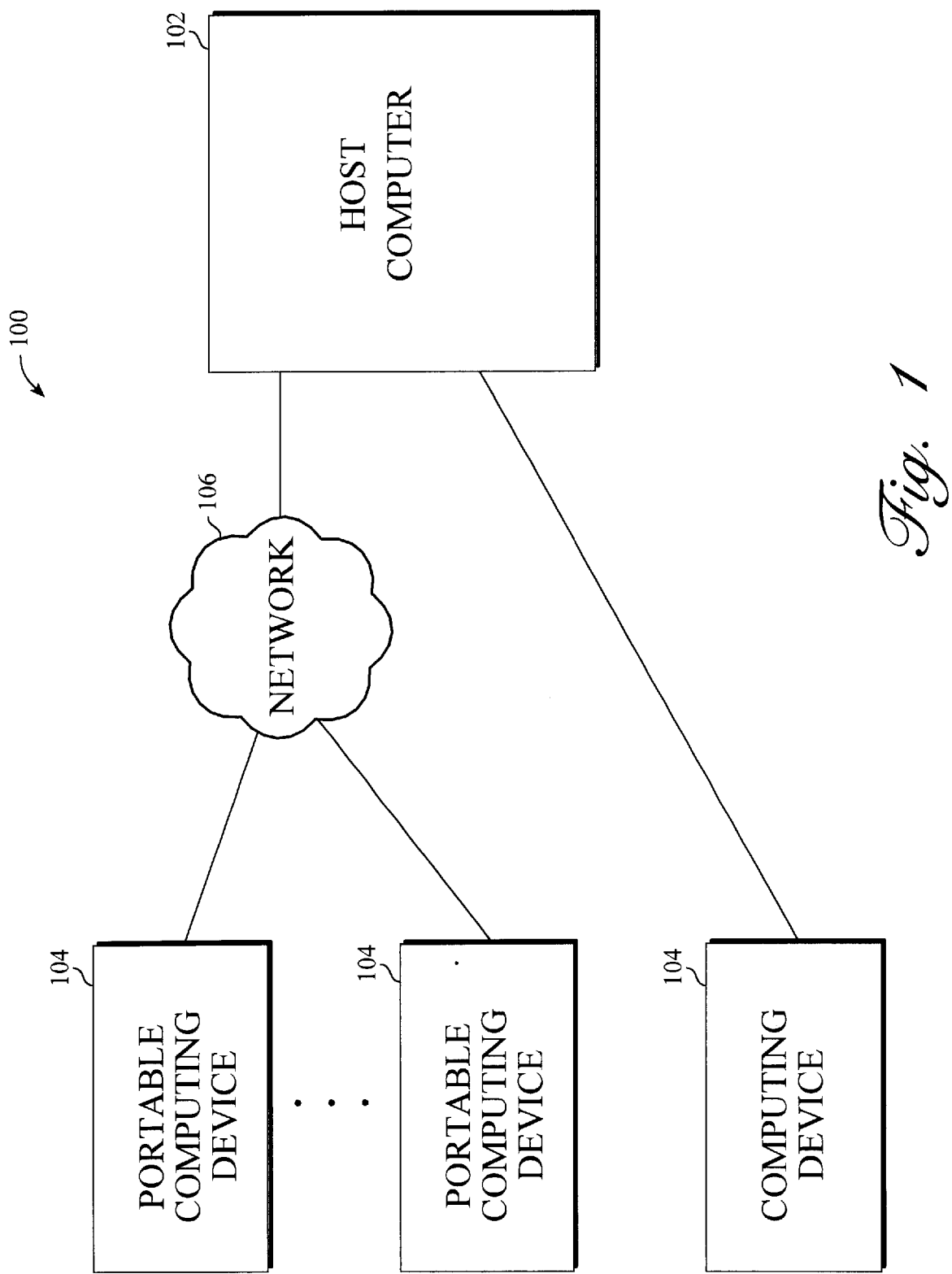
FIG. 1 is a diagrammatic representation of a system in which the present invention may be implemented.

With reference to FIG. 1, there is shown a system 100 in which the present invention may be implemented, the system 100 comprising a host computer 102 and a plurality of computing devices 104, some of which may be portable. For purposes of the present invention, portable computing devices 104 may take the form of any portable device having processing capability, including but not limited to that of a laptop computer, a notebook computer, a personal digital assistant (e.g. a PalmPilot or a Windows CE device), and a portable telephone. Devices 104 are described herein as being portable because portable devices are the ones most likely to be stolen. However, it should be noted that the teachings disclosed herein may also be applied to non-portable computing devices. Such an extension is within the scope of the invention.

In system 100, each of the computing devices 104 is required to interact with the host computer 102 on a fairly regular basis. If a device 104 does not interact with the host computer 102 prior to the expiration of an authorization parameter stored within the device 104, then the mechanism of the present invention (discussed further below) renders the device 104 inoperable. To interact with the host computer 102, each of the computing devices 104 forms a communications connection with the host 102. This connection may be a direct connection, or it may be a connection formed via a network 106, such as a dedicated local area network (LAN) or a dial up network or a wireless network. Once a connection is formed, the computing device 104 can interact with the host computer 102 to implement the methodology of the present invention.

Figure 2:
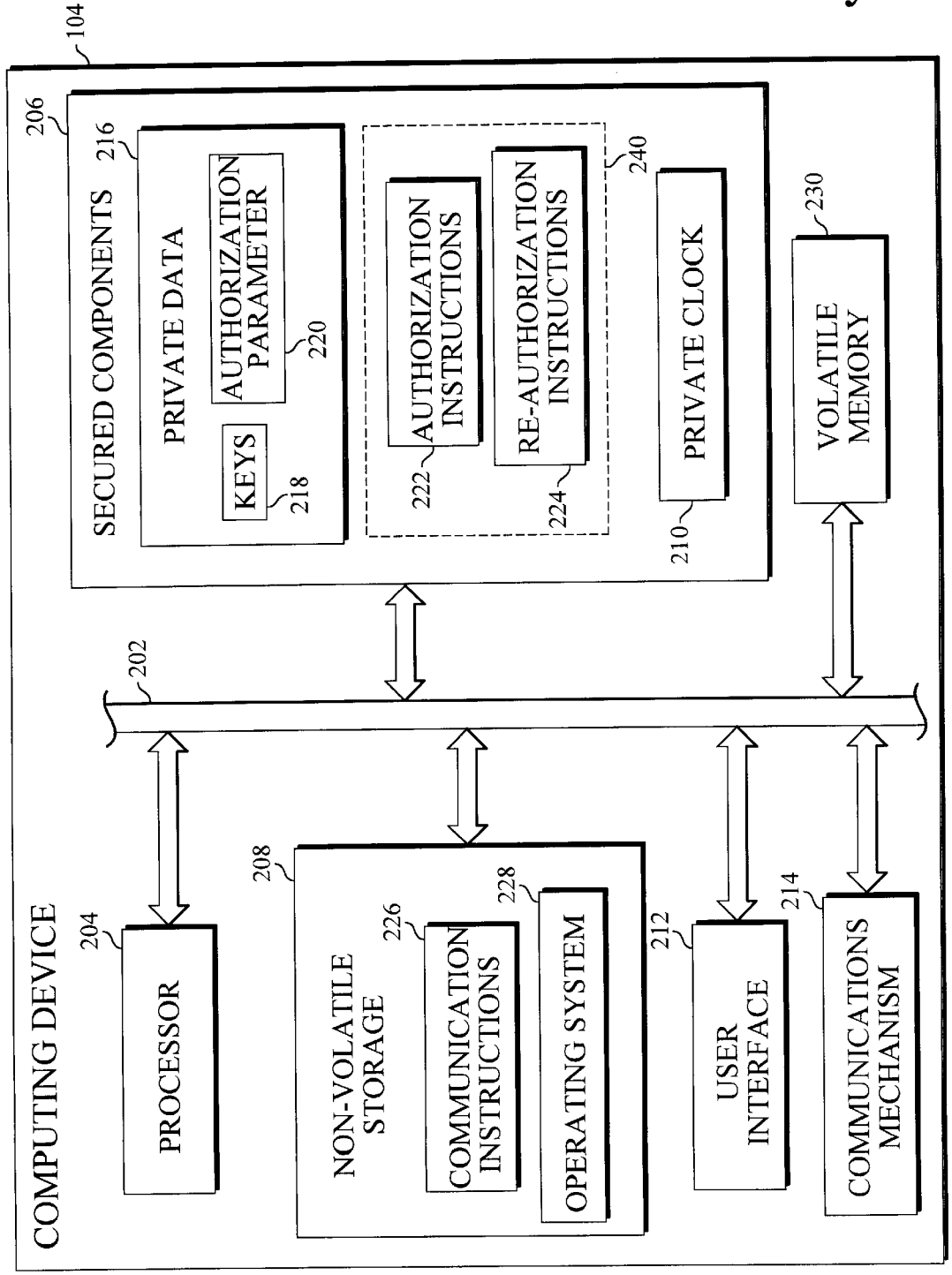
FIG. 2 is a detailed block diagram of a computing device wherein an embodiment of the present invention is implemented.

With reference to FIG. 2, there is shown a detailed block diagram of a computing device 104 in accordance with one embodiment of the present invention. The computing device 104 comprises a main bus 202 and a plurality of components coupled to the main bus 202, including a processor 204 and a set of secured components 206.

Secured components 206 comprise three components: (1) management instructions 240; (2) private data 216; and (3) a private clock 210 (optional). The management instructions 240 comprise a set of authorization 222 instructions, a set of re-authorization instructions 224. The management instructions 240 are stored in non-volatile memory, and, in one embodiment, in firmware. The authorization instructions 222 are executed by the processor 204 to determine whether the device 104 has interacted with the host computer 102 prior to the expiration of the authorization parameter 220. It is the authorization instructions 222 that cause the processor 204 to prevent further operation of the device 104 if the device 104 has not interacted with the host computer 102. The re-authorization instructions 224 are executed by the processor 204 to update selected parameters in the private data section 216. It is the re-authorization instructions 224 that control the interaction between the host computer 102 and the computing device 104. The sets of data that are used and manipulated by the authorization instructions 222 and the re-authorization instructions 224 in carrying out the methodology of the present invention are stored within the private data portion 216. These sets of data include an authorization parameter 220 and one or more keys 218. The private clock 210 is a component that maintains time for the utility of the management instructions 240. In one embodiment, the private clock 210 is resettable only by the processor 204 while executing the management instructions 240. This helps to preserve the integrity of the clock 210 and to prevent the present invention from being easily circumvented. As discussed further below, the private clock 210 may be used to determine whether the authorization parameter 220 stored in the private data portion 216 has expired.

In the embodiment illustrated in FIG. 2, the secured components 206 are shown as separate and distinct components. It need not be so, however. If so desired, the components 206 and their associated functionality may be incorporated wholly or in part into the processor 204. For purposes of the present invention, the important characteristic of the secured components 206 is that they cannot be altered by regular memory-mapped computer programs. Instead, they can only be altered by the processor 204 while executing the management instructions 240. As a result, this makes the secured components 206 impervious to software attack, which in turn makes the present invention extremely difficult to circumvent.

In addition to the processor 204 and the secured component 206, the computing device 104 further comprises a non-volatile storage 208 (such as a hard drive) and a volatile memory 230, both of which are coupled to the main bus 202. Unlike the secured components 206, both the storage 208 and the memory 230 are freely accessible by computer programs. The volatile memory 230 is used by the processor 204 as temporary storage to facilitate instruction execution and data manipulation. The non-volatile storage 208, on the other hand, serves as permanent storage for storing various computer program instructions and associated data. For purposes of the present invention, these program instructions include a set of communication instructions 226 and an operating system 228 (in some implementations, instructions 226 and operating system 228 may reside in the volatile memory 230). The communication instructions 226 are executed by the processor 204 to form a communications connection between the computing device 104 and the host computer 102 to allow the two machines to interact, and the operating system 228 is executed by the processor 204 to provide a platform for supporting other programs. The operating system 228 may be one of many available operating systems, including but not limited to Windows, UNIX, and Macintosh OS.

The computing device 104 further comprises a user interface 212 and a communications mechanism 214, both of which are coupled to the main bus 202. The user interface 212 includes all of the components necessary for receiving input from and providing output to a user, including but not limited to a display, an audio system (e.g. sound card and speakers), a keyboard, a mouse, a trackball, a pen or stylus, a touch sensitive screen, and a microphone. The communications mechanism 214 comprises all of the components necessary for transferring information into and out of the computing device 104. Communications mechanism 214 may include, for example, a modem and/or a network/ethernet card.

Figure 3:
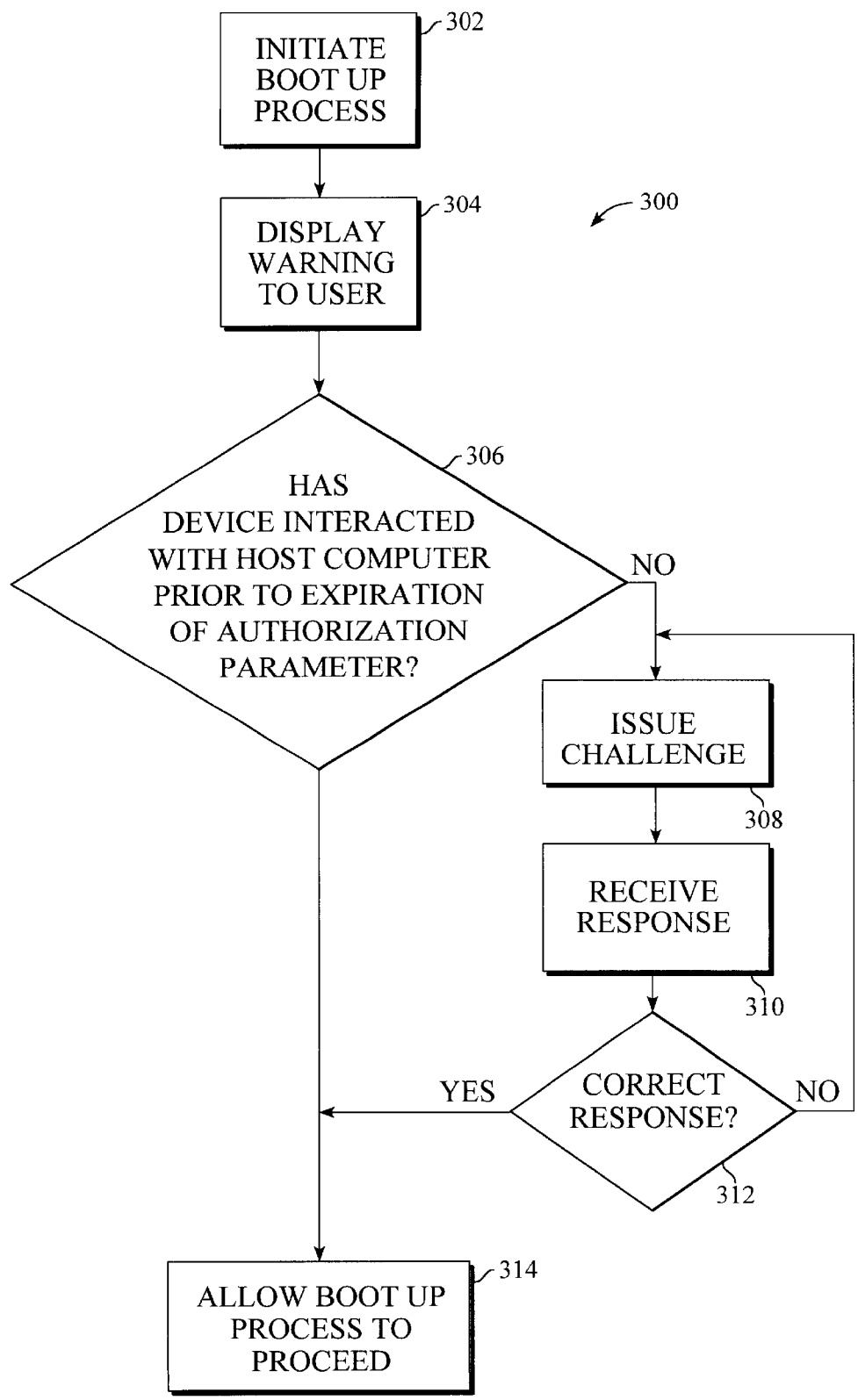
FIG. 3 is a flow diagram illustrating a boot up process in accordance with the present invention.
Figure 4:
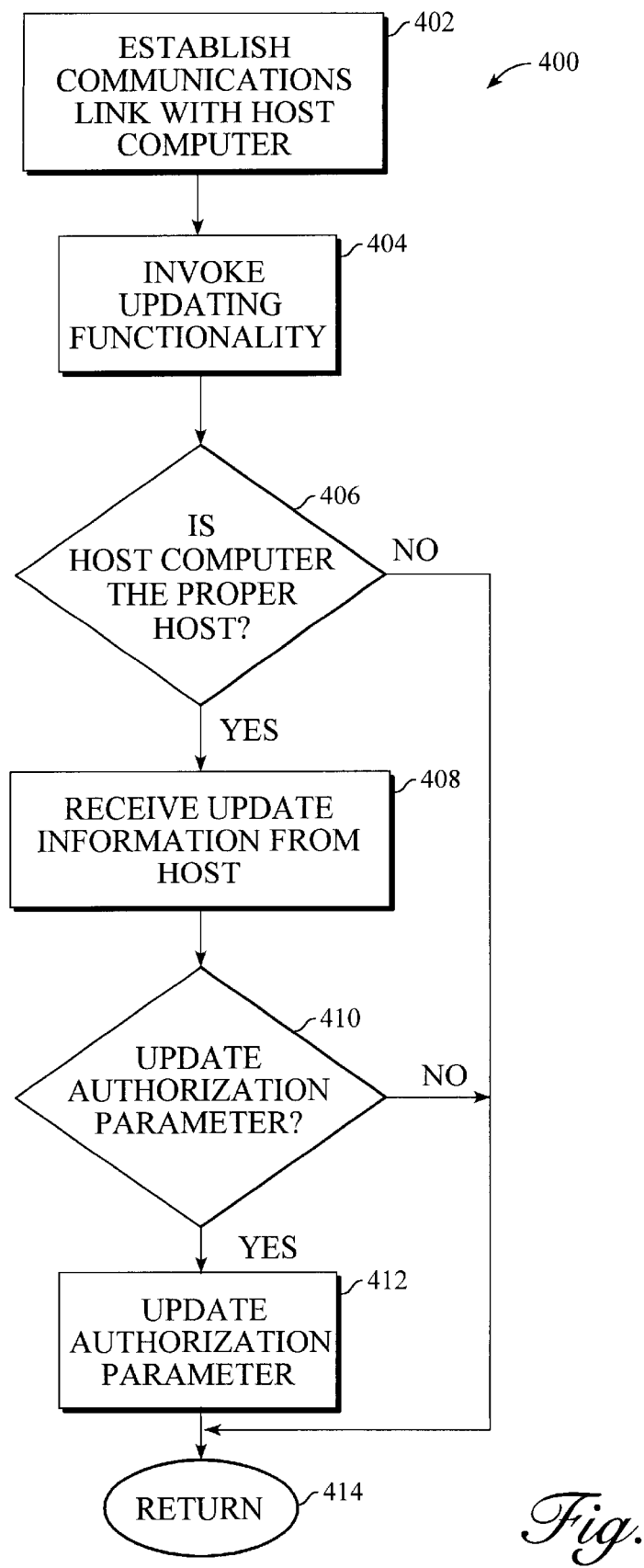
FIG. 4 is a flow diagram illustrating the process for updating the authorization parameter of the present invention.

The physical embodiment of the computing device 104 has been disclosed. With reference to FIGS. 3 and 4, the operation of the device 104 will now be described. Referring first to FIG. 3, the functionality of the present invention is invoked, in one embodiment, by a user initiating (302) a boot up process for the computing device 104. This boot up process may be initiated by powering up or resetting the device 104, or by issuing a reboot command causing a "soft" reboot to occur. Once the boot up process is initiated, the processor 204 begins executing the authorization instructions 222. Under direction of the authorization instructions 222, the processor 204 first displays a warning (304) to the user via the user interface 212. This warning, designed to deter the purchase of the device 104 from a thief, warns the user that the device 104 is armed with a disabling mechanism, and that if the device 104 does not interact with a host computer prior to the expiration of an authorization parameter, the device 104 will be rendered inoperable. A sample warning may be as follows:

WARNING: This device is armed with a theft deterrent mechanism which will disable the device by [a certain date] unless the device interacts with a a host computer. DO NOT purchase this device unless the seller provides verifiably accurate information as to which host computer to contact and how to enable this device to interact with that host.

The authorization parameter 220 stored in the private data portion 216 may, in one embodiment, be used as the "certain date" in the sample warning. The goal of this warning is to significantly discourage the purchase of the device 104 from a thief. If successful, the warning will reduce if not eliminate the resale market for a stolen device 104, which will remove the incentive for stealing the device in the first place.

After displaying the warning, the processor 204 proceeds to (306) to determine whether the device 104 has interacted with an authorized host computer prior to the expiration of the authorization parameter 220. The determination of whether the authorization parameter 220 has expired is made in accordance with an expiration policy. This expiration policy may be any desired policy, including but not limited a time-based policy and a use-based policy. Under a time-based policy, the authorization parameter 220 expires after a certain amount of time (e.g. one week). Under a use-based policy, the authorization parameter 220 expires after a certain functionality (such as a boot up) has been invoked a certain number of times.

In a time-based implementation, the authorization parameter 220 takes the form of a "valid until" time value. To determine whether the authorization parameter 220 has expired, the processor 204 compares-the "valid until" time value with a current time value provided by the private clock 210. If the "valid until" time value is less than the current time value, then the authorization parameter 220 has expired. In a use-based implementation, the authorization parameter 220 takes the form of a count. Each time a certain functionality (e.g. a boot up) is invoked, the count is decremented. If the count has a value less than or equal to zero, then the authorization parameter 220 has expired. Otherwise, the authorization parameter is still valid.

If the processor 204 determines in (306) that the authorization parameter 220 has not expired, then the processor 204 allows the boot up process to proceed (314). This in turn enables the computing device 104 to operate normally. On the other hand, if the processor 204 determines that the authorization parameter 220 has expired, thereby meaning that the computing device 104 has not interacted with an authorized host computer as required, then the processor 204 prevents further operation of the computing device 104. Processor 204 may accomplish this in any desired way, including but not limited to preventing the boot up process from proceeding, preventing the loading of operating system 228, or both. In one embodiment, (306) is carried out early in the boot up process, prior to the loading of the operating system 228. By halting the boot up process at such an early stage, the processor 204 makes further operation of the computing device 104 impossible. In this manner, the present invention renders the device 104 inoperable.

It is appreciated that a device 104 may fail to interact with a host computer 102 for legitimate reasons unrelated to theft. For example, an employee may be out of the country for an extended period of time during which he has no access to the host computer 102. To accommodate such scenarios, the present invention provides a mechanism for "unlocking" the device 104 once the authorization parameter 220 has expired. Various methodologies can be used for this purpose. In the embodiment shown in FIG. 3, a challenge/response methodology using public/private keys is employed.

More specifically, in response to a determination that the authorization parameter 220 has expired, the processor 204 issues a challenge (308) to the user via the user interface 212. This challenge is derived by the processor 204 by generating a random number and then encrypting that random number using a first public key pre-established for this purpose. This public key is stored as one of the keys 218 in the private data portion 216. Once the challenge is issued, it is up to the user to provide a response. In order to provide a proper response, the user must: (1) decrypt the challenge using a private key associated with the first public key used by the processor 204, to extract the random number; and (2) reencrypt the random number using a second public key associated with the computing device 104.

Once the user provides a response via the user interface 212, the processor 204 receives the response (310) and makes a determination (312) as to whether the response is correct for the issued challenge. Processor 204 carries out (312) by decrypting the response using a private key (stored in the keys portion 218 of the private data 216) associated with the second public key to extract the random number, and then comparing the extracted random number with the random number originally generated by the processor 204. If the two numbers are equal, then the response is deemed to be correct, in which case the processor 204 allows the boot up process to proceed (314). If the two numbers are not equal, then the processor 204 returns to (308) to continue rendering the computing device 104 inoperable.

Suppose now that the computing device 104 has interacted with the host computer 102 recently, so that the boot up process is allowed to proceed and complete. In completing the boot up process, the operating system 228 is loaded into volatile memory 230. Once loaded, the operating system 228 is executed by the processor 204 to provide a platform for other applications. Once the operating system 228 is executing and the boot up process is completed, the computing device 104 is ready for normal operation.

To maintain operability, the computing device 104 at some point prior to the expiration of the authorization parameter 220 needs to interact with an authorized host computer 102. To cause the device 104 to interact with the host computer 102, a user, the operating system 228, or a memory-mapped program invokes (402 of FIG. 4) the functionality of the communications instructions 226. Once normal operation has been established, instructions 226 may be executed by the processor 204 in the same manner as any other computer program.

Under direction of the communication instructions 226, the processor 204 performs all of the functions necessary for establishing (402) a communications link (via the communications mechanism 214) between the computing device 104 and the host computer 102. This may involve dialing in to the host computer 102 using a modem or forming a connection through an ethernet card, or using an already existing network connection. In one embodiment, the communication instructions 226 cause the processor 204 to perform two additional functions: (1) send a unique identification associated with the computing device 104 to the host computer 102; and (2) receive from a user and send to the host computer 102 a user login and a password.

The unique identification enables the host computer 102 to determine whether the computing device 104 is one that has been reported as stolen. If the computing device 104 has been registered as stolen, then the host computer 102 can refuse to interact with the device 104. By refusing to interact with the stolen device, and hence refusing to update the authorization parameter 220, the host computer 102 dooms the authorization parameter 220 to eventual expiration (within a relatively short period of time or small number of uses). Once the authorization parameter 220 expires, the device 104 is rendered inoperable, as described above. Thus, the stolen device is effectively disabled.

The user login and password serve a similar security purpose. Namely, even if a stolen device 104 has not been registered as stolen, and even if the thief or a customer of the thief knows which host computer to contact, the illegitimate user will still not be able to log in to the host computer 102 unless he knows a specific user login and associated password. Assuming that the illegitimate user does not have access to such information, the stolen device 104 will not be able to log in, and hence will not be able to interact with the host computer 102. Without such interaction, the authorization parameter 220 of the device 104 will expire shortly, and the device 104 will be rendered inoperable as described above. Again, the stolen device is effectively disabled.

Assuming that the device 104 has not been reported as stolen, and that the proper user login and password are provided, a communications connection will be formed between the computing device 104 and the host computer 102. Once that is achieved, the processor 204 invokes (404) the re-authorization functionality of the present invention.

Under direction of the re-authorization instructions 224, the processor 204 makes a determination (406) as to whether the host computer 102 is an authorized host. In one embodiment, (406) is carried out using a challenge/response methodology using public/private keys. More specifically, the processor 204 begins by generating a random number. Processor 204 then encrypts the random number using a third public key (stored in the keys portion 218 of the private data 216) associated with the host computer 102. The encrypted random number is then sent via the communications mechanism 214 as a challenge to the host computer 102. If the host computer 102 is a proper host, it will respond by: (1) decrypting the challenge using a private key associated with the third public key to derive the random number; (2) reencrypting the random number using the second public key associated with the computing device 104; and (3) sending the reencrypted random number as a response to the computing device 104 via the communications mechanism 214. Once the response is received, the processor 204 decrypts the response using a private key associated with the second public key to extract the random number, and then compares the extracted random number with the originally generated random number. If the two numbers are not equal, then the host computer 102 is not a proper host, in which case the processor 204 returns control (414) to the communication instructions 226. No update is performed on the authorization parameter 220.

On the other hand, if the two numbers are equal, then in one embodiment, processor 204 proceeds to (408) to receive a set of update information from the host computer 102. This update information indicates to processor 204 whether the authorization parameter 220 should be updated, and if so, how. The update information gives the host computer 102 an opportunity to update the authorization parameter 220 to extend the term of operability of the computing device 104, or to update the parameter 220 to a value that immediately expires. If the processor 204 determines (410) that the authorization parameter 220 should not be updated, then no update is performed. On the other hand, if the processor 204 determines that the authorization parameter 220 should be updated, then it proceeds to (412) to perform the update. In updating (412) the authorization parameter 220, the processor 204 may. use the update information received from the host computer 102, which, in one embodiment, may include an updated "valid until" time value or a new count value. These updated values in most instances extend the term of operability of the computing device 104. By updating the authorization parameter 220, the host computer 102 in effect re-authorizes the computing device 104 for operation for another term.

At this point, it should be noted that the checking and the updating of the authorization parameter 220 are controlled solely by the authorization instructions 222 and the re-authorization instructions 224. Since these instructions and the private data 216 are secured and hence cannot be altered by memory-mapped computer programs, they are impervious to software attack. This helps to ensure that the present invention cannot be easily circumvented. Thus, the present invention provides an effective mechanism for rendering stolen computing devices inoperable.

Thus far, the functionality of the invention has been described as being achieved by way of the processor 204 executing various sets of instructions 222, 224, 226. While this is an effective implementation, it is not the only one. If so desired, the functionality of the invention may instead be achieved using dedicated hardware circuits designed to perform the same functions.

Also, the authorization instructions 222 have been described as executing during a boot up process. While this is an advantageous implementation, it should be noted that if desired, the instructions 222 may be executed after boot up has been completed. This and various other modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method for operating a computing device, comprising:
   determining whether the computing device has been re-authorized by an authorized host computer prior to expiration of an authorization parameter; and
   in response to a determination that the computing device has not been re-authorized by the authorized host computer prior to the expiration of said authorization parameter, preventing further operation of the computing device,
   wherein the expiration of said authorization parameter is determined based upon a use-based expiration policy, such that said authorization parameter expires after a certain functionality has been invoked a certain number of times.

2. A method for operating a computing device, comprising:
   determining whether the computing device has been re-authorized by an authorized host computer prior to expiration of an authorization parameter; and
   in response to a determination that the computing device has not been re-authorized by the authorized host computer prior to the expiration of said authorization parameter, preventing further operation of the computing device,
   wherein determining and preventing are performed during a boot-up process prior to loading of an operating system.

3. The method of claim 2, wherein preventing comprises: preventing an operating system from loading.

4. The method of claim 2, wherein preventing comprises: preventing a boot-up process from proceeding.

5. The method of claim 2, wherein preventing comprises:
   displaying a challenge to a user;
   receiving a response from the user to said challenge;
   determining whether said response is correct for said challenge; and
   in response to a determination that said response is not correct, preventing further operation of the computing device.

6. The method of claim 2, wherein determining and preventing are carried out by one or more processors executing at least a subset of a set of management instructions, and wherein said management instructions cannot be reprogrammed by an end user.

7. The method of claim 6, wherein said management instructions reside in firmware.

8. The method of claim 2, wherein said authorization parameter cannot be altered by a program created by an end user.

9. The method of claim 2, further comprising:

communicating with a host computer;

determining whether the computing device should be re-authorized; and in response to a determination that the computing device should be re-authorized, updating said authorization parameter to re-authorize the computing device.

10. The method of claim 9, wherein determining whether the computing device should be reauthorized comprises:

determining whether the host computer is an authorized host computer.

11. The method of claim 9, wherein determining whether the computing device should be re-authorized comprises:

determining whether the host computer has indicated that the computing device is to be re-authorized.

12. The method of claim 9, wherein updating is carried out by one or more processors executing at least a subset of a set of management instructions, and wherein said management instructions cannot be reprogrammed by an end user.

13. The method of claim 12, wherein said management instructions reside in firmware.

14. The method of claim 9, wherein said authorization parameter cannot be updated by a program created by an end user.

15. The method of claim 9, wherein said updating is carried out by one or more processors executing a set of re-authorization instructions, and wherein said authorization parameter can be updated only by said one or more processors while executing said set of re-authorization instructions.

16. A computing device, comprising:

a storage having stored therein an authorization parameter;

a mechanism for determining whether said computing device has been re-authorized by an authorized host computer prior to expiration of said authorization parameter; and a mechanism for preventing, in response to a determination that the computing device has not been re-authorized by the authorized host computer prior to the expiration of said authorization parameter, further operation of said computing device, wherein said mechanism for determining and said mechanism for preventing are invoked during a boot up process for said computing device prior to loading of an operating system.

17. The computing device of claim 16, where said mechanism for preventing prevents further operation of said computing device by preventing an operating system from loading.

18. The computing device of claim 16, where said mechanism for preventing prevents further operation of said computing device by preventing a boot up process from proceeding.

19. The computing device of claim 16, wherein said mechanism for determining and said mechanism for preventing comprise one or more processors executing at least a subset of a set of management instructions, and wherein said management instructions cannot be reprogrammed by an end user.

20. The computing device of claim 19, wherein said management instructions reside in firmware.

21. The computing device of claim 16, wherein said authorization parameter cannot be altered by a program created by an end user.

22. The computing device of claim 21, wherein said storage is implemented in firmware.

23. The computing device of claim 16, wherein said mechanism for preventing comprises:

a mechanism for displaying a challenge to a user;

a mechanism for receiving a response from the user to said challenge;

a mechanism for determining whether said response is correct for said challenge; and a mechanism for preventing, in response to a determination that said response is not correct, further operation of said computing device.

24. The computing device of claim 16, further comprising:

a mechanism for communicating with a host computer;

a mechanism for determining whether said computing device should be re-authorized; and a mechanism for updating, in response to a determination that said computing device should be re-authorized, said authorization parameter to re-authorize said computing device.

25. The computing device of claim 24, wherein said mechanism for updating comprises one or more processors executing at least a subset of a set of management instructions, and wherein said management instructions cannot be reprogrammed by an end user.

26. The computing device of claim 25, wherein said management instructions reside in firmware.

27. The computing device of claim 24, wherein said authorization parameter cannot be altered by a program created by an end user.

28. The computing device of claim 24, wherein said mechanism for updating comprises one or more processors executing a set of re-authorization instructions, and wherein said authorization parameter can only be altered by said one or more processors while executing said re-authorization instructions.

29. A computing device, comprising:

a storage having stored therein an authorization parameter;

a mechanism for determining whether said computing device has been re-authorized by an authorized host computer prior to expiration of said authorization parameter; and a mechanism for preventing, in response to a determination that the computing device has not been re-authorized by the authorized host computer prior to the expiration of said authorization parameter, further operation of said computing device;

wherein the expiration of said authorization parameter is determined based upon whether a certain functionality has been invoked a certain number of times.

30. The method of claim 2, wherein the expiration of said authorization parameter is determined based upon a time-based expiration policy such that said authorization parameter expires after a period of time.

* * * * *